United States Patent
Werni et al.

(10) Patent No.: US 9,758,323 B2
(45) Date of Patent: Sep. 12, 2017

(54) NEEDLE GRIPPER

(71) Applicant: J. Schmalz GmbH, Glatten (DE)

(72) Inventors: Benjamin Werni, Bondorf (DE);
Tobias Stahl, Glatten (DE)

(73) Assignee: J. SCHMALZ GmbH, Glatten (DE)

( * ) Notice: Subject to any disclaimer, the term of this patent is extended or adjusted under 35 U.S.C. 154(b) by 0 days.

(21) Appl. No.: 15/026,109

(22) PCT Filed: Sep. 24, 2014

(86) PCT No.: PCT/US2014/070382
§ 371 (c)(1),
(2) Date: Mar. 30, 2016

(87) PCT Pub. No.: WO2015/049141
PCT Pub. Date: Apr. 9, 2015

(65) Prior Publication Data
US 2016/0257509 A1    Sep. 8, 2016

(30) Foreign Application Priority Data

Oct. 1, 2013 (DE) .......................... 10 2013 219 933

(51) Int. Cl.
*B65H 3/22*     (2006.01)
*B25J 15/00*    (2006.01)

(52) U.S. Cl.
CPC ............ *B65H 3/22* (2013.01); *B25J 15/0071* (2013.01); *B65H 2405/60* (2013.01); *B65H 2511/20* (2013.01); *B65H 2511/222* (2013.01)

(58) Field of Classification Search
CPC .... B25J 15/0071; B65H 3/22; B65H 2405/60; B65H 2511/20; B65H 2511/222

(Continued)

(56) References Cited

U.S. PATENT DOCUMENTS 3,608,890 A * 9/1971 Littlefield ................ B65H 3/22
                                                    271/21
4,009,786 A * 3/1977 Littlewood .............. B65H 3/22
                                                    271/18.3

(Continued)

FOREIGN PATENT DOCUMENTS

CN     103108818 A    5/2013
DE       4307142 C1   5/1994

(Continued)

OTHER PUBLICATIONS

Abstract of DE4307142C1.
Abstract of DE102011083451A1.
Abstract of CN103108818A.

*Primary Examiner* — Dean Kramer
(74) *Attorney, Agent, or Firm* — Ware, Fressola, Maguire & Barber LLP

(57) ABSTRACT

Needle gripper features a gripper unit with a gripping surface facing a workpiece to grip, and a needle carriage with a gripping needle. The needle carriage moves into an active position extending the gripping needle beyond the gripping surface by one needle stroke depth, and in a passive position retracting the gripping needle, and features a drive unit with a drive actuator driven forward/backward along a drive direction that couples to the needle carriage so it moves into the passive/active positions by driving the drive actuator forward/backward. A setting device for setting the needle stroke depth includes a guide carriage displaceable perpendicularly to the drive direction along a guide direction, and a stop for the guide carriage. The drive actuator couples via connection arm to the guide carriage so when the drive actuator moves backward, the guide carriage moves in the direction toward the stop, which prevents further backwards movement.

20 Claims, 6 Drawing Sheets

(58) Field of Classification Search
USPC .................................................. 294/61, 8.6
See application file for complete search history.

(56) References Cited

U.S. PATENT DOCUMENTS

| | | | | |
|---|---|---|---|---|
| 4,687,241 A * | 8/1987 | Schell | ...................... | B65H 3/22 271/18.3 |
| 5,114,132 A * | 5/1992 | Arato | ...................... | B65H 3/22 221/213 |
| 5,951,001 A * | 9/1999 | Stradi | ...................... | B65H 3/22 271/104 |
| 8,104,807 B2 * | 1/2012 | Maffeis | ................ | B25J 15/0071 294/119.1 |
| 2013/0187398 A1 * | 7/2013 | Cho | ..................... | B25J 15/0071 294/61 |

FOREIGN PATENT DOCUMENTS

| | | |
|---|---|---|
| DE | 102011010326 | 8/2011 |
| DE | 202012100849 | 4/2012 |
| DE | 102011083451 | 3/2013 |
| DE | 102011083451 A1 | 3/2013 |

\* cited by examiner

NEEDLE GRIPPER

CROSS-REFERENCE TO RELATED APPLICATIONS

This application corresponds to international patent application serial no. PCT/EP2014/070382, filed 24 Sep. 2014, which claims benefit to German patent application serial no. 10 2013 219 933.3, filed 1 Oct. 2013, which is incorporated by reference in their entirety.

BACKGROUND OF THE INVENTION

1. Field of Invention

The invention relates to a needle gripper.

2. Description of Related Art

So-called needle grippers are devices with preferably a plurality of gripping needles which can be retracted into and extended from a gripper base part or a gripper housing, for gripping a workpiece. Such needle grippers are used particularly for gripping fabrics, fiber materials, fiber composites and other materials that can be penetrated by needles. Needle grippers are also used particularly for picking up such workpieces in layers from a stack of workpieces and thus for separating them.

The reliability of the needle gripper here depends on a precise and failure-free retracting and extending of the gripping needles. In the process, it can be problematic, on the one hand, when the stroke depth of the gripping needles is not adapted to the properties of the workpieces, particularly to the thickness of the workpiece layer. In this case, a reliable picking up and separation of an individual workpiece layer is not reliably possible. Moreover, in the case of repeated picking up of fiber workpieces, fiber parts are unintentionally pulled into the gripping device, due to the retracting and extending of the gripping needles, which also negatively impacts the reliability and which can require maintenance and cleaning.

From DE 10 2011 010 326 A1 and DE 20 2012 100 849 U1, needle grippers are known, in which the extension and retraction of the gripping needles is driven via a pinion gear by a piston which can be displaced axially and which in particular is driven pneumatically. Here, the stroke of the drive piston is limited by means of a stop acting in axial direction of the piston. A setting of the piston stroke and thus indirectly of the stroke of the retractable and extendable gripping needles here requires a variation of the axial position of the stop for the drive piston.

The problem of the present invention consists, in the case of a needle gripper, in increasing the reliability of the handling of workpieces and at the same time reducing the susceptibility to failure of the needle gripper in operation. Here, in particular, a reliable adaptation of the penetration depth of the gripping needles is to be made possible, and it should be made possible to conveniently do the cleaning and maintenance work that becomes necessary in the case of repeated gripping procedures.

SUMMARY OF THE INVENTION

This problem is solved by a needle gripper according to claim 1. The needle gripper comprises a gripper unit, a drive unit, and a setting device for setting the needle stroke depth. These units can be accommodated in a common gripper housing. However, modular designs are also conceivable, in which the individual units, in particular the drive unit and the gripper unit, are respectively accommodated in a modular manner in separate unit housings.

The gripper unit has a gripping surface facing the workpiece to be gripped as well as at least one and preferably two or more needle carriages each having at least one gripping needle. The needle carriage is arranged so that it can be displaced in the gripper unit and can be moved into an active position in which the gripping needle is extended beyond the gripping surface by a needle stroke depth for gripping the workpiece, and can be retracted into a passive position in which the gripping needle is retracted. In principle, the gripping needles themselves can also be retracted and extended slantwise with respect to the gripping surface, whereby the gripped workpiece can be secured against slipping off of the needle. Even if the gripping needles are retracted and extended slantwise, in the present context the needle stroke depth should be understood as a dimension substantially perpendicular to the gripping surface.

The drive unit comprises a drive actuator which can be displaced along a drive direction. This drive actuator can perform a stroke movement between two positions (hereafter referred to as the forward driven position and the backward driven position). The drive actuator is movably coupled to the needle carriage so that, in the case of displacement of the drive actuator in a first direction (for example, so-called backward driving), the needle carriage is moved into the active position (extended gripping needles), and, in the case of displacement of the drive actuator into a second position (for example, so-called forward driving), the needle carriage is moved into the passive position (retracted gripping needles).

The setting device is used for setting the needle stroke depth and has a guide carriage which can be displaced perpendicularly to the drive direction of the drive actuator. The direction along which the guide carriage can be displaced is referred to below as guide direction. The mobility of the guide carriage along the guide direction is limited at least on one side by a stop. The drive actuator is movably coupled by means of a connection arm to the guide carriage so that, in the case of the backward driving of the drive actuator, the guide carriage is pulled in the direction toward the stop, and thus a further backward driving of the drive actuator is prevented by blocking of the guide carriage.

In that respect the guide carriage can be displaced perpendicularly to the stroke of the drive actuator. By means of the connection arm, the movement of the drive actuator is coupled particularly rigidly to the movement of the drive carriage. In that respect, in the case of backward driving of the drive actuator, the drive carriage is pulled against the stop and, in the case of forward driving of the drive actuator, it is moved in the direction away from the stop. The movements of guide carriage and guide actuator in that respect are permanently coupled and possible only jointly. If the guide carriage impacts with the stop, then this restricts a further movement of the drive actuator.

Due to the stop, the end position of the guide carriage is predetermined particularly in the direction which corresponds to the backward driving motion of the drive actuator. As a result, the end position of the drive actuator is predetermined only indirectly in the direction which corresponds to the extended position of the gripping needles. As a result, the needle stroke depth can be set. For the drive actuator itself, no stop is needed. In contrast to the prior art mentioned at the start, the limiting stop is also provided non-axially relative to the drive piston. The installation space in the axial direction, which is needed in the case of the mentioned constructive solutions, can therefore be saved or used otherwise.

In order to couple the perpendicular movements of the drive actuator and the guide carriage to one another, the connection arm preferably extends slantwise with respect to the drive direction and slantwise with respect to the guide direction, so that a slantwise guiding between the drive actuator and the guide carriage is implemented. The angle of the connection arm or its direction of extension relative to the drive direction and to the guide direction is fixed particularly in the case of the movement of the drive actuator and the guide carriage. Preferably, the angle is about 45° relative to the two perpendicular directions.

In order to fix the angle of the connection arm and the drive direction, respectively, the connection arm, on the one hand, can be fixed on the drive actuator, and, on the other hand, in a position spaced apart from the drive actuator, can have a guide pin which is guided in a running groove extending parallel to the drive direction, in at least one housing wall. In that respect, the connection arm can be moved along as a whole with the drive actuator during its forward and backward driving motions. The guide pin here moves along with it in the running groove parallel to the drive direction, whereby the angle of the connection arm remains constant.

In order to enable, at constant angle of the connection arm, a movement of the guide carriage, the connection arm is preferably guided in its direction of extension in a manner so that it can slide along its direction of extension on the guide carriage, in particular it is slidably guided through a passage (for example, a guide hole) in the guide carriage. In its movement along the guide direction, the guide carriage therefore also slides simultaneously along the direction of extension of the connection arm, since the latter extends slantwise with respect to the guide direction.

In particular, the guide carriage has a sliding protrusion, preferably two sliding protrusions that protrude into opposite directions, each sliding in a guide groove in a housing wall of the needle gripper. The sliding protrusion can be designed, for example, as a pin-like or bar-like section of the guide carriage, which slides with its lateral surface in the guide groove.

Preferably, the position of the stop for the guide carriage can be set by means of an adjustment device. The adjustment device preferably comprises a stop bolt or stop pin that provides a stop, which can be adjusted along the guide direction. The stop bolt or stop pin can be guided, for example, in the guide groove which also guides the sliding protrusion of the guide carriage. The adjustment of the stop bolt or of the stop pin can occur, for example, by twisting a thread around the guide direction. For this purpose, it is possible, for example, to provide a knurled nut that can be twisted on a thread. The knurled nut and the stop bolt or stop pin can be connected, for example, to a threaded sleeve, or they can be configured to form a single part with said threaded sleeve. The knurled nut can preferably be twisted through openings in the housing of the needle gripper, so that the needle stroke depth can be adjusted conveniently as needed.

For further design, the position of the stop which can be set in this way along the guide direction can be displayed using a display means. For example, the gripper housing can have an observation opening or an observation well or an observation recess through which the stop itself, for example, the stop pin, or a pointer connected thereto can be seen. In particular, the display means, for example, the observation opening in the housing, can have a scale, so that a stop position can be set reproducibly.

The limitation of the needle stroke via the movable coupling to the guide carriage allows a reliable predetermination, using a simple construction, of the retracted and extended state of the gripping needles. For improving the monitoring, at least one sensor for detecting a position of the guide carriage along the guide direction can be provided in the setting unit. The sensor is designed, in particular, for detecting a contact of the guide carriage with the stop. For this purpose, the sensor is arranged in a sensor recess arranged in the movement track of the guide carriage. The sensor can be designed, for example, as a magnetic sensor with which the presence or absence of a test magnet arranged on the guide carriage can be detected. Preferably, two sensors spaced apart along the guide direction are provided, so that, for example, the presence of the active position and of the passive position can be detected. The detected information can be sent, for example, to a gripper control unit, which controls the needle gripper as needed, particularly depending on its gripping state (workpiece gripped or workpiece not gripped).

In a design of the needle gripper with adjustment device, the sensor is preferably attached on a sensor recess whose position along the guide direction is also set by means of the adjustment device. If the position of the stop is adjusted for adaptation to a workpiece thickness using the adjustment device, then the sensor is moved along with it. In this way, an end position control can be achieved independently of the adjustment state. During the adjustment of the stop, the sensor is automatically adjusted along with it. It is not necessary to set the sensor separately after the adjustment of the stop.

In the case of the above-described design, the sensor recess can be arranged, for example, directly on the stop bolt/stop pin or on the threaded sleeve for the adjustment of the stop of the adjustment device.

In principle, in the described needle gripper, the drive unit can comprise a pneumatically or electrically driven drive actuator. Thus, for example, a drive piston which can be driven forward and driven backward can be provided, which forms the drive actuator. In the same way, a drive actuator that can be displaced electrically, for example, in an electrical linear drive, can be provided. In principle, it is also possible that the drive unit comprises a drive actuator which can be gripped open to rotation in two directions of rotation, which drives the needle carriage via a gear unit for the movement into the active or passive position.

Independently of the drive, the drive actuator preferably drives the needle carriage via a gear unit. In particular, if several needle carriages are provided, the drive actuator can jointly drive the several needle carriages via the gear unit. For example, the drive actuator and the needle carriages each have a rack section, wherein the toothed rod sections engage with a transmission pinion, so that a forward driving and a backward driving of the drive actuator is coupled with a back and forth shifting movement of the needle carriage.

A particularly advantageous design for guiding the movement of the needle carriage consists in that at least one housing inner wall, but preferably two mutually facing housing inner walls of the gripper unit, has/have a guide relief with a groove section extending lengthwise, in particular, and connected thereto an extraction indentation. The needle carriage here slides with a sliding section (for example, a pin or a bar section of the needle carriage) in the groove section between its active position and its passive position. If the transition from groove section and extraction indentation is not blocked (for example, by a maintenance plate, see below), then the needle carriage can therefore be introduced into the extraction indentation. Here, the extraction indentation is implemented so that, after the introduction of the sliding section of the guide carriage into the extraction indentation, the needle carriage can be extracted from the gripper unit. This makes it possible, in a simple way, to clean the movable needle carriage, for example, if fibers of the handled workpieces are pulled into the gripper unit during retracting and extending of the needles. In addition, a simple replacement of the needle carriages is possible, for example, in the case of damage. By this measure, the reliability of the handling of fibrous workpieces is improved, and the susceptibility to failure is decreased.

These advantages can be achieved by a needle gripper of the above-described type. However, in principle, it is possible to increase the reliability and to reduce the susceptibility to failure by means of the represented measure, independently of the concrete design of the drive unit and/or the setting device.

In that respect, the problem formulated at the start is also solved by the described design of the gripper unit with the guide relief, wherein the needle gripper has at least the following features:
 a gripper unit with a gripping surface facing the workpiece to be gripped and with at least one (preferably two) needle carriages with at least one gripping needle, wherein the at least one needle carriage can be displaced into an active position in which the gripping needle is extended across the gripping surface by one needle stroke depth, and into a passive position in which the gripping needle is retracted;
 a drive unit with a drivable drive actuator which is movably coupled to the needle carriage for its movement into the active position and into the passive position;
 wherein, at least one housing inner wall of the gripper unit has a guide relief with a groove section and an extraction indentation, wherein the needle carriage has a sliding section with which it slides in the groove section between its active position and its passive position in the gripper unit, and wherein the needle carriage can be extracted from the gripper unit by introducing the sliding section into the extraction indentation of the guide relief.

In principle, the drive actuator can here be designed as a piston which can be driven forward and backward, as already described, but can also be designed as a driveshaft for introducing a rotary drive movement. Here, a rotational drive movement can be converted by means of an appropriate transmission into a retraction and extension movement for the needle carriages. The remaining features described above for the needle gripper can then be used for further design. In particular, a setting direction for setting the needle stroke depth in the described manner is provided.

Independently of the design of the drive unit, the gripper unit can comprise a housing with a maintenance opening for extracting the needle carriage, when the latter is accommodated in the extraction indentation of the guide relief. Here, a maintenance plate for closing the maintenance opening, which can be attached and removed, is preferably provided so that, if the maintenance opening is closed, the extraction indentation of the guide relief is blocked by the maintenance plate. In this way, the guide carriage can be taken out only when the maintenance plate has been taken off.

The maintenance plate can be detachably held with a snap-in closure in the housing, and, for this purpose, it can comprise one or more suitable snap-in protrusions which engage with associated snap-in recesses in the housing of the gripper unit or of the needle gripper.

BRIEF DESCRIPTION OF THE DRAWING

The invention is explained in further detail below in reference to the figures.

The figures show.

In the description below as well as in the figures, the same respective reference numbers are used for identical features or features equivalent to one another.

DETAILED DESCRIPTION OF THE BEST MODE OF THE INVENTION

Figure 1:
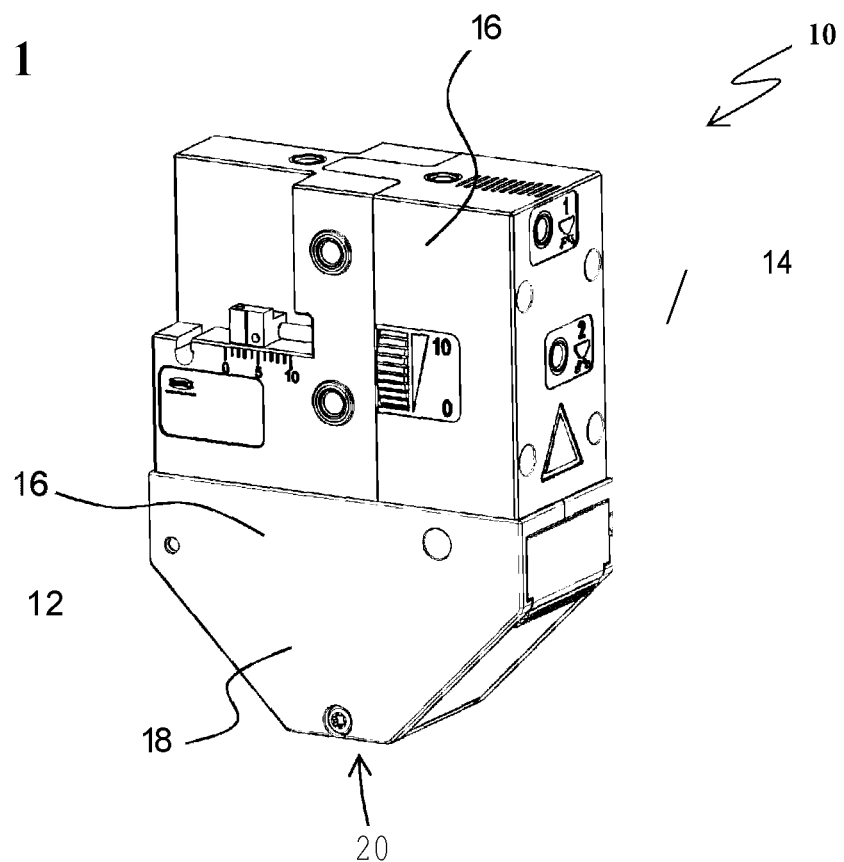
FIG. 1, a perspective outside view of a needle gripper.

FIG. 1 shows a needle gripper 10, which has a modular design in the represented example, consisting of a gripper unit 12 and an associated drive unit 14. The needle gripper 10 comprises a gripper housing 16, which in principle can be configured in several parts for the different units (with corresponding unit housings), but which can also be configured as a single part for the needle gripper 10. The gripper housing 16 comprises, in particular in the area of the gripper unit 12, housing walls 18 (here: side walls 18) and a gripping surface 20 facing the workpiece.

Figure 2:
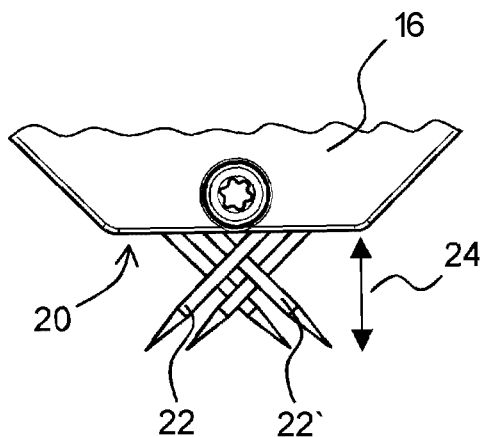
FIG. 2, a detail view onto the gripper unit with extended gripping needles.

As can be seen in the detail view according to FIG. 2, for gripping the workpiece, several gripping needles 22, 22' can be extended from the gripping surface 20, for the purpose of which the latter can have needle openings associated with the gripping needles. Preferably, several gripping needles 22, 22' are provided, which, when they are extended from the gripping surface 20, extend slantwise towards one another and thus crisscross one another. In this way, a stable holding of the workpiece is made possible. As shown in the represented example, the gripping needles 22, 22' can be oriented slantwise with respect to the gripping surface 20. A needle stroke depth 24 is defined as a dimension representing the effective penetration depth of the needles perpendicularly to the gripping surface 20.

Figure 3:
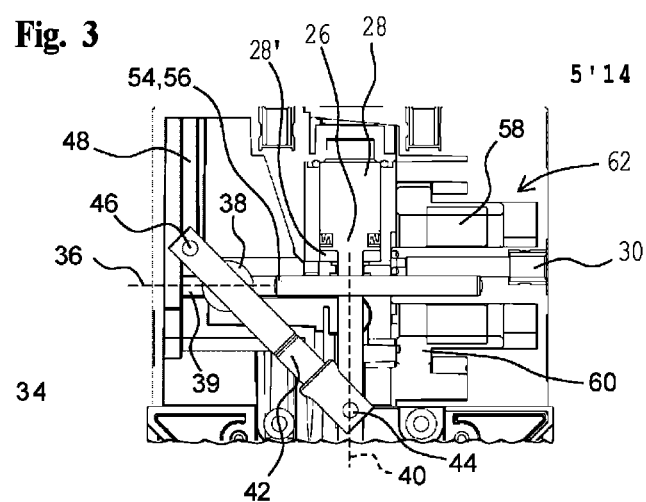
FIG. 3, a cross-sectional representation for explaining the setting device for the needle stroke depth.

As can be seen in the cross-sectional representation according to FIG. 3, the drive unit 14 comprises a drive actuator 26 which can be displaced in two directions and which is driven pneumatically in the represented example. For this purpose, the drive unit 14 comprises two interior pressure chambers 28, 28', which can be exposed to pressurized fluid (for example, pressurized air) for moving the drive actuator 26 in opposite directions. For this purpose, corresponding pressure connections 30 are provided.

The drive actuator 26 is movably coupled via a gear unit (see, for example, FIG. 10: toothed pinion) to needle carriage 32 (see FIGS. 9 and 10), so that, when the drive actuator 26 is driven backward (in FIG. 3 in the upward direction, for example, by pressurizing the pressure chamber 28'), the needle carriage 32 is moved in the direction toward the gripping surface 20, and the gripping needles 22 are extended across the gripping surface 20 (so-called active position).

Figure 6:
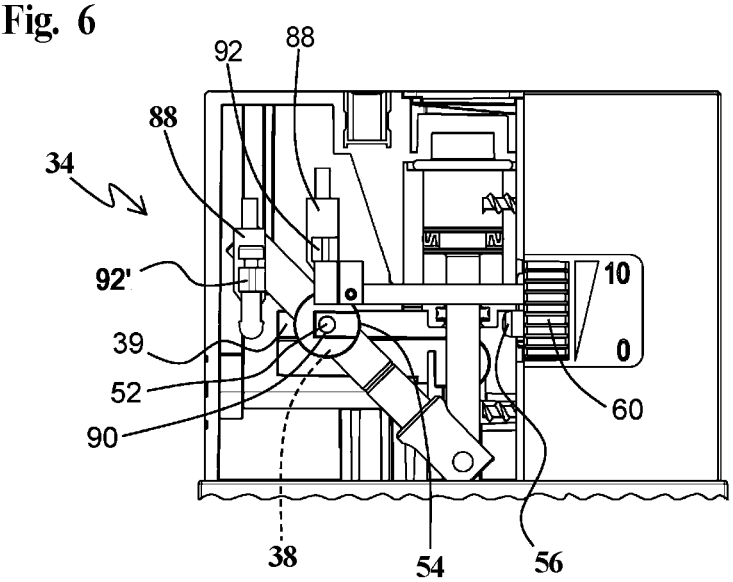
FIG. 6, a partial cross-sectional representation through the gripper unit according to FIG. 3.

In addition, the needle gripper 10 comprises a setting device 34 by means of which the maximum needle stroke depth 24 can be set and which can be seen more precisely particularly in FIGS. 3 and 6. The setting device 34 comprises a guide carriage 38 which is mounted in the gripper housing 16 in such a way that it is movable along a guide direction 36. The guide carriage 38 is arranged eccentrically, lying radially outside, relative to the drive actuator 26. In the represented example, the guide carriage 38 is configured in the manner of a sliding block; it is guided in corresponding guide grooves 39 in an inner wall of the gripper housing 16. The guide direction 36, along which the guide carriage 38 can be displaced, here extends perpendicularly to a drive direction 40 along which the drive actuator 26 can be driven forward and backward.

The movement of the drive actuator 26 is coupled via a connection arm 42 to the movement of the guide carriage 38. The connection arm 42 extends slantwise with respect to the drive direction 40 and the guide direction 36. Here, the angle of the connection arm 42 with respect to the mentioned directions in the case of movement of the drive actuator 26 is fixed, approximately 45° in the represented example. This is achieved in that the connection arm 42 is connected, on the one hand, to an attachment point 44 on the drive actuator, and, on the other hand, it is guided in a manner so that it can be displaced by means of a guide pin 46 in a running groove extending parallel to the drive direction 40, in the housing inner wall. In order to also enable, in the case of movement of the drive actuator 26 in the drive direction 40, a movement of the guide carriage 38 along the guide direction 36, the connection arm 42 is slidably guided along its direction of extension through a passage 50 (see also FIG. 5) in the guide carriage 38. In the case of movement of the drive actuator 26 along the drive direction 40, the connection arm 42 is moved as a whole along the drive direction 40. In the process, the guide carriage 38 slides along the connection arm 42, whereby the guide carriage 38 is moved along the guide direction 36.

Figure 5:
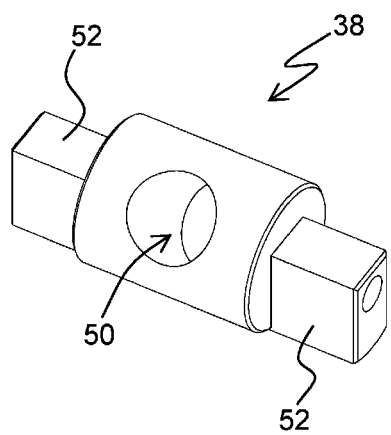
FIG. 5, a perspective representation of the guide carriage.

The guide carriage 38 has two sliding protrusions 52 which protrude in opposite directions and which run in the guide grooves 39 of the housing inner wall (see FIGS. 5 and 6).

The freedom of movement of the guide carriage 38 along the guide direction 36 is limited by a stop 54, which, in the represented example, is formed by a stop bolt 56 which extends in the guide groove 39. The stop bolt 56 is connected to a threaded sleeve 58, which runs on a threading and which can be displaced along the guide direction 36 by twisting. For twisting the threaded sleeve 58, the latter can be provided with a circumferential knurled nut 60, which can be twisted through an operating opening in the housing (see FIG. 4).

By means of the adjustable stop 54, an adjustment device 62 is provided, by means of which the travel of the guide carriage 38 and thus indirectly the maximum stroke of the drive actuator 28 can be limited. As a result, by means of the adjustment device 62, the needle stroke 24 can also be set indirectly.

Figure 4:
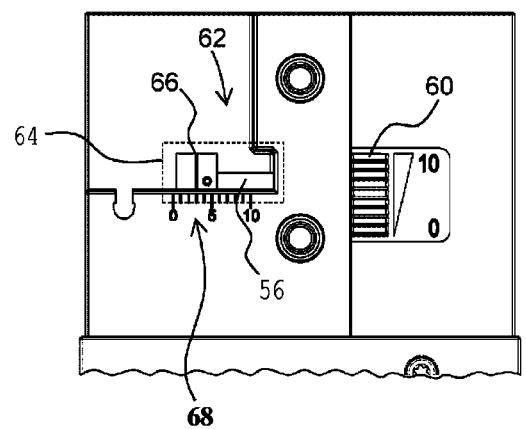
FIG. 4, a detail of the side view onto a needle gripper according to FIG. 1.

As indicated in FIG. 4, the gripper housing 16 can moreover comprise an observation opening 64 or an observation recess 64, through which the position of the stop 54 can be seen, for example, by means of a suitable pointer 66. For the reproducible setting of the needle stroke depth 24, for example, in the area of the observation opening or observation recess 64, a scale 68 can be provided on the housing 16 (see FIG. 4).

Figure 7:
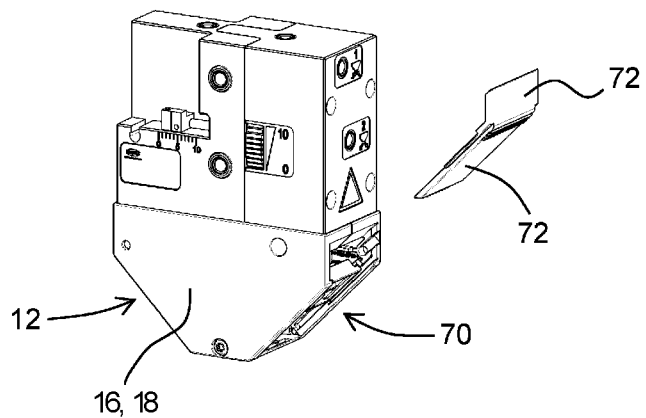
FIG. 7, the needle gripper according to FIG. 1 with maintenance plate removed.
Figure 9:
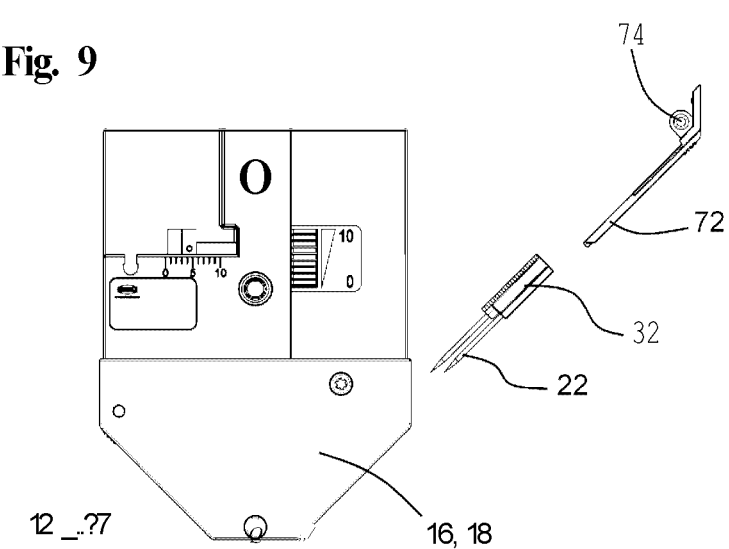
FIG. 9, a diagrammatic representation for explaining the replacement of a needle carriage.

In principle, independently of the concrete design of the drive unit 14 and/or the setting device 34, in the case of a gripper unit 12, an exchangeability of the needle carriage 32 can be implemented in a convenient manner, as explained below in reference to FIGS. 7 to 9. The gripper housing 16 has a maintenance opening 70 which is arranged, in the represented example, in a small side of the housing 16 between the side walls 18 and adjoining the gripping surface 20. The maintenance opening 70 can be closed with a maintenance plate 72. The maintenance plate 72 can be engaged, for example, by means of a snap-in protrusion 74 in the interior of the housing wall. When the maintenance plate 72 has been taken off, the needle carriage 32 can be extracted from the gripper unit 12, for example, for cleaning purposes, as indicated in FIG. 9.

Figure 8:
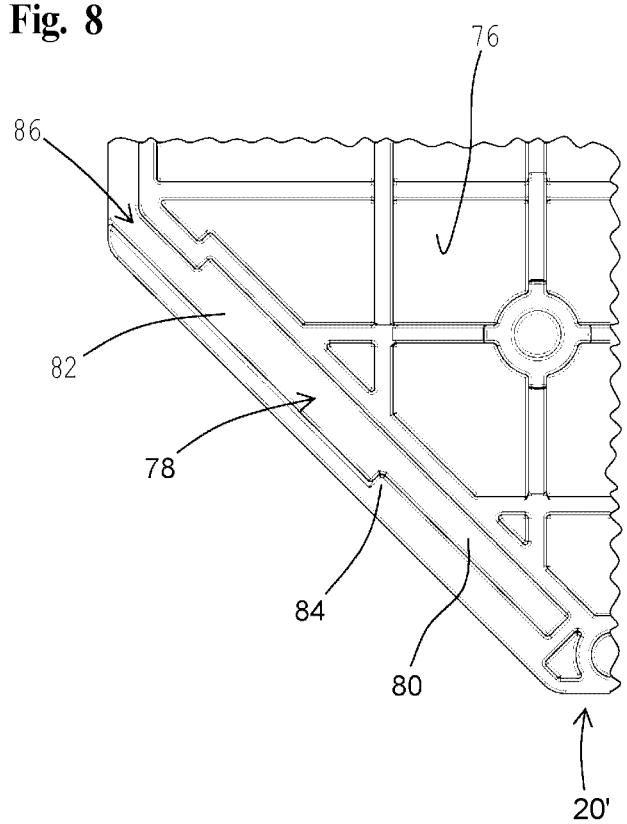
FIG. 8, a view onto a housing inner wall of the gripper unit of the needle gripper.

In order to enable the extraction of the needle carriage 32 and at the same time enable an operationally reliable guiding of the needle carriage 32 when the maintenance plate 72 is inserted, the design explained in reference to FIG. 8 can be used. FIG. 8 shows a view of a housing inner wall 76 of the gripper housing 16, in the represented example the inner side of the side wall 18. The housing inner wall 76, in its marginal area adjoining the maintenance opening 70, has a guide relief 78, which is designed as recess in the housing inner wall 76. The guide relief 78 has a lengthwise extending groove section 80 in which an inserted needle carriage 32 can slide back and forth between an active position and a passive position. The groove section 80 extends preferably along the section of the housing inner wall 26 adjoining the maintenance opening 70, in the direction toward the section 20' adjoining the gripping surface 20. In its area facing away from the gripping surface, the guide relief 78 has an extraction indentation 82 which transitions with a step-like ledge 84 into the groove section 80.

The needle carriage 32 slides with a sliding section in the shape of a bar, for example, in the groove section 80 of the guide relief 78. For extracting the needle carriage 32, this sliding section can be introduced into the extraction indentation 82, and the needle carriage 32 can be extracted via an extraction guide 86 from the extraction indentation 82. However, this is only possible if the maintenance plate 72 has been taken off. In the inserted state, the maintenance plate 72 blocks the extraction indentation 82 and secures the needle carriage 32 in the groove section 80.

In order to enable an end position control for the gripping needles 22, it is possible to arrange sensors 88 along the guide direction 36, by means of which the approaching of a test magnet 90 arranged on the guide carriage 38 can be detected. One of the sensors 88 can be arranged, for example, in a sensor recess 92 which is firmly connected to the stop 54. When the position of the stop is displaced with the adjustment device 62 (see FIG. 3), the position of the sensor along the guide direction 36 is varied thereby along with it. However, it is also conceivable to provide a sensor 88 in a sensor recess 92' arranged fixed in the gripper housing, for example, in order to detect a retracted state of the gripping needles 22.

Figure 10:
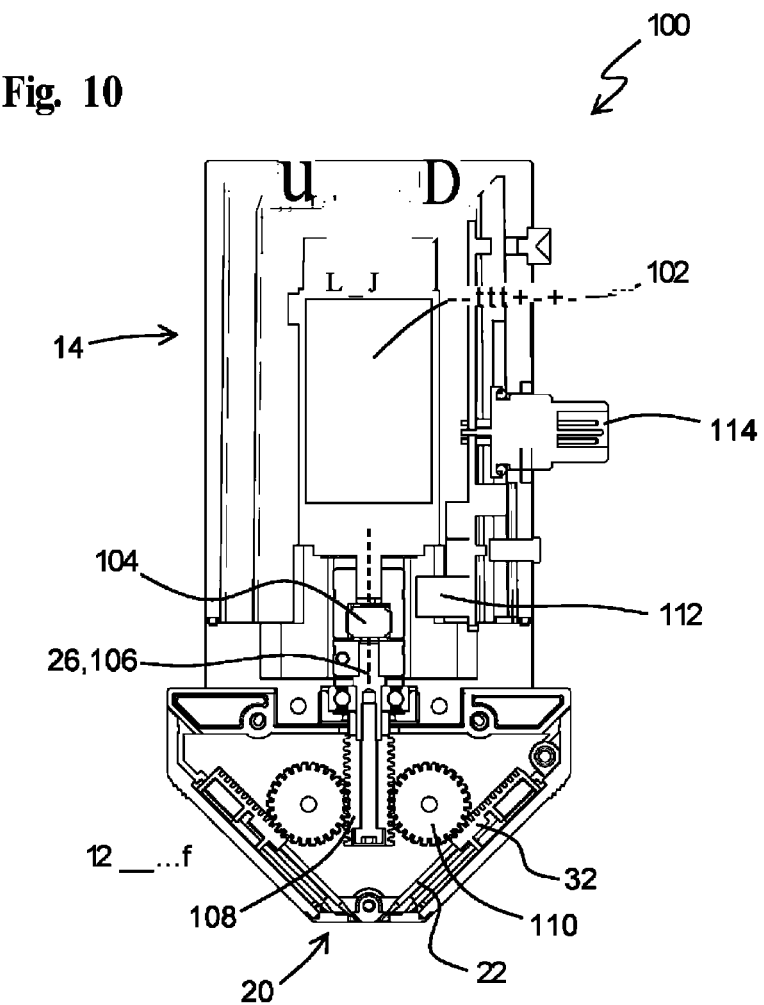
FIG. 10, a needle gripper with a drive unit comprising an electrical rotary drive.

FIG. 10 shows a needle gripper 100 in which the drive unit 14 has an electric rotatory motor which, in the represented example, is designed as a stepper motor 102. For example, via a coupling 104, the stepper motor 102 drives a drive actuator 26 designed as a driveshaft 106. The driveshaft 106 extends (for example, along the so-called drive direction 40) into the gripper unit 12. For driving the needle carriages 32, the driveshaft 106 has a screw section 108 which engages with transmission pinions 110, which in turn engage with associated rack sections of the needle carriages 32. By targeted controlling of the stepper motor, the needle stroke depth can therefore be set precisely. For this purpose, a control device 112 can be provided, which can be connected to a machine control via a plug connection 114.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. Needle gripper (10) for gripping a workpiece, comprising
   a gripper unit (12) with a gripping surface (20) facing the workpiece to be gripped, and at least one needle carriage (32) with at least one gripping needle (22), wherein the at least one needle carriage (32) can be displaced into an active position in which the gripping needle (22) is extended beyond the gripping surface (20) by a needle stroke depth (24), and in a passive position in which the gripping needle (22) is retracted,
   a drive unit (14) with a drive actuator (26) which can be driven forward and backward along a drive direction (40), wherein the drive actuator (26) is coupled to the movement of the at least one needle carriage (32) so that the at least one needle carriage (32) can be moved into the passive position and into the active position by driving the drive actuator (26) forward and backward, and
   a setting device (34) for setting the needle stroke depth (24), characterized in that the setting device (34) comprises a guide carriage (38) which can be displaced perpendicularly to the drive direction (40) along a guide direction (36), and a stop (54) for the guide carriage (38), wherein the drive actuator (26) is coupled by means of a connection arm (42) to the movement of the guide carriage (38) so that, when the drive actuator (26) is driven backward, the guide carriage (38) is moved in the direction toward the stop (54), and further driving backward of the drive actuator (26) is prevented.

2. Needle gripper (10) according to claim 1, characterized in that the connection arm (42) extends slantwise with respect to the drive direction (40) and to the guide direction (36).

3. Needle gripper (10) according to claim 2, characterized in that the connection arm (42) is guided in a manner so that it can slide along its direction of extension on the guide carriage (38).

4. Needle gripper (10) according to claim 2, characterized in that the guide carriage (38) has at least one sliding protrusion (52), wherein the at least one sliding protrusion (52) slides in a guide groove (39) of a housing wall (18) of the needle gripper (10).

5. Needle gripper (10) according to claim 2, characterized in that an adjustment device (62) for setting the position of the stop (54) along the guide direction (36) is provided.

6. Needle gripper (10) according to claim 2, characterized in that the position of the stop (54) along the guide direction (36) can be displayed using a display means (64, 66).

7. Needle gripper (10) according to claim 2, characterized in that at least one sensor (88) for detecting a position of the guide carriage (38) along the guide direction (36) is provided.

8. Needle gripper (10) according to claim 7, characterized in that the sensor (88) is arranged on a sensor socket (92), whose position along the guide direction (36) can also be set by means of the adjustment device (62).

9. Needle gripper (10) according to claim 1, characterized in that the connection arm (42) is guided in a manner so that it can slide along its direction of extension on the guide carriage (38).

10. Needle gripper (10) according to claim 1, characterized in that the guide carriage (38) has at least one sliding protrusion (52), wherein the at least one sliding protrusion (52) slides in a guide groove (39) of a housing wall (18) of the needle gripper (10).

11. Needle gripper (10) according to claim 1, characterized in that an adjustment device (62) for setting the position of the stop (54) along the guide direction (36) is provided.

12. Needle gripper (10) according to claim 1, characterized in that the position of the stop (54) along the guide direction (36) can be displayed using a display means (64, 66).

13. Needle gripper (10) according to claim 1, characterized in that at least one sensor (88) for detecting a position of the guide carriage (38) along the guide direction (36) is provided.

14. Needle gripper (10) according to claim 13, characterized in that the sensor (88) is arranged on a sensor socket (92), whose position along the guide direction (36) can also be set by means of the adjustment device (62).

15. Needle gripper (10) according to claim 1, characterized in that the drive unit (14) comprises a drive piston (26) which can be driven forward and backward pneumatically.

16. Needle gripper (100) according to claim 1, characterized in that the drive unit (14) has an electrically driven drive actuator (26).

17. Needle gripper (10) according to claim 1, characterized in that the drive actuator (26) drives the one or more needle carriages (32) via a gear unit.

18. Needle gripper (10) according to claim 1, characterized in that at least one housing inner wall (76) of the gripper unit (12) comprises a guide relief (78) with a groove section (80) and with an extraction indentation (82), wherein the at least one needle carriage (32) comprises a sliding section by means of which it slides in the groove section (80) between its active position and its passive position, and wherein the needle carriage (32) can be extracted from the gripper unit (12) by introducing the sliding section into the extraction indentation (82) of the guide relief (78).

19. Needle gripper (10) according to claim 18, characterized in that the gripper unit (12) comprises a housing (16) with a maintenance opening (70) for extracting the at least one needle carriage (32), wherein a maintenance plate (72) for the purpose of closing the maintenance opening (70), which can be attached and removed, is provided so that, when the maintenance opening (70) is closed, the extraction indentation (82) is blocked by the maintenance plate (72).

20. Needle gripper (10) according to claim 19, characterized in that the maintenance plate (72) has a snap-in protrusion (74) which, in the case in which the maintenance plate (72) is attached to the housing (16), engages with an associated snap-in recess or snap-in opening.

* * * * *